United States Patent [19]
Washizu et al.

[11] Patent Number: 5,005,553
[45] Date of Patent: Apr. 9, 1991

[54] VENTILATION SYSTEM FOR AUTOMOTIVE ENGINE

[75] Inventors: Takehiro Washizu; Tsutomu Nagamatsu, both of Iwata, Japan

[73] Assignee: Yamaha Hatsudoki Kabushiki Kaisha, Iwata, Japan

[21] Appl. No.: 485,458

[22] Filed: Feb. 27, 1990

[30] Foreign Application Priority Data

Feb. 28, 1989 [JP] Japan .................................. 1-47312

[51] Int. Cl.$^5$ ............................................ F02M 25/00
[52] U.S. Cl. .................................... 123/572; 123/573
[58] Field of Search ............. 123/572, 573, 574, 52 M

[56] References Cited
U.S. PATENT DOCUMENTS

3,111,120 11/1963 Cornwell ........................... 123/572
4,563,986 1/1986 Nakano ............................... 123/572
4,603,673 8/1986 Hiraoka et al. ...................... 123/572
4,686,946 8/1987 Umeda et al. ....................... 123/572

Primary Examiner—Andrew M. Dolinar
Assistant Examiner—M. Macy
Attorney, Agent, or Firm—Ernest A. Beutler

[57] ABSTRACT

A number of embodiments of internal combustion engine constructions having intake manifold passages that extend from the intake ports back over the top of the engine and above the cylinder head assembly to provide a long intake passage for good low speed running. In all embodiments, an oil separator is formed in the cam cover and the engine is inclined from the vertical so as to permit clearance for the oil separator beneath the intake manifold without increasing the overall height of the engine.

10 Claims, 7 Drawing Sheets

VENTILATION SYSTEM FOR AUTOMOTIVE ENGINE

BACKGROUND OF THE INVENTION

This invention relates to a ventilation system for an automotive engine and more particularly to an improved engine arrangement that permits the use of a tuned induction system and a conveniently positioned crankcase ventilation system and oil separator therefor.

As is well known, the induction system for an internal combustion engine is very important in determining the performance of the engine. Recently it has been acknowledged that the performance of the engine, at least under some running conditions, can be improved by providing a relatively long intake runners that serve the individual ports of the engine. However, in many automotive applications the use of such long runners can give rise to certain problems.

Obviously, the engine compartment of motor vehicles is quite compact. Therefore, the provision of an intake system for the engine having long runners can be difficult to position within the engine compartment. One way that long runners can be achieved is by having the manifold double back over the top or cylinder head of the engine from the intake port and extend toward the other side of the engine. However, where the engine has overhead valves and overhead camshafts, the positioning of the intake manifold over the cylinder head can give rise to spatial problems. In addition, such an orientation can adversely effect the hood line of the vehicle. Since it is important to provide a low hood line for both aerodynamic and styling purposes, it must be insured that the height of the engine is not too great.

Furthermore, all engines employ a crankcase ventilating system for causing ventilating air to flow through the internal portions of the engine and particularly over the oil in the crankcase and through the cam chamber of the cylinder head. It is normally the practice to employ some form of oil separator to separate lubricant from the circulated air so that the lubricant will not be discharged to the atmosphere. In addition, if the lubricant is not removed from the circulating air, the quantity of oil in the lubricating system can become depleted.

With many types of engines, particularly those of the in line type, it has been the practice to position the oil separator in the cam cover of the engine. Of course, the oil separator must have a certain volume to operate effectively. If the intake system passes over the cylinder head and oil separator, then the height of the engine can be significantly increased.

It is, therefore, a principal object of this invention to provide an improved oil separator and manifold arrangement for an internal combustion engine that permits a low overall height without sacrificing any of the functional aspects of the engine.

It is a further object of this invention to provide an improved engine construction wherein an oil separator can be positioned in the head assembly of the engine, the intake manifold can pass at least in part over the oil separator and the engine nevertheless has a low overall height.

SUMMARY OF THE INVENTION

This invention is adapted to be embodied in an internal combustion engine having a cylinder block with at least one cylinder bore therein. A cylinder head assembly is affixed to the cylinder block and closes the cylinder bore. A crankcase ventilating oil separator is affixed to the cylinder head assembly and protrudes at least in part upwardly therefrom. An intake port is formed in one side of the cylinder head assembly to supply a charge to the cylinder bore. An intake manifold extends from the intake port and across the cylinder head assembly toward the other side thereof and above the crankcase ventilation oil separator. In accordance with the invention, the cylinder block is disposed with the axis of its cylinder bore inclined from the vertical for increasing the distance between the crankcase ventilation oil separator and the intake manifold without increasing the height of the engine.

DETAILED DESCRIPTION OF THE PREFERRED EMBODIMENTS OF THE INVENTION

Figure 1:
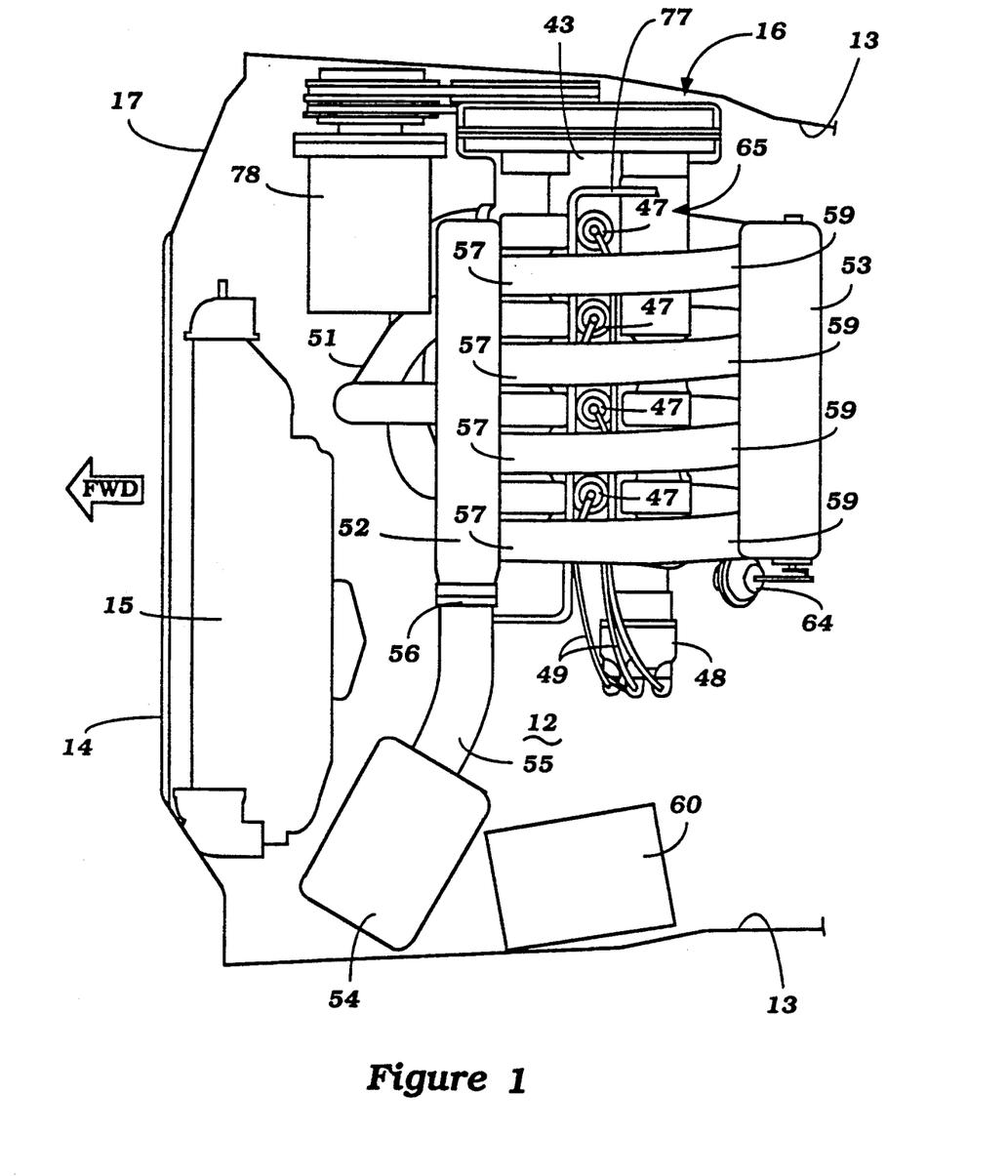
FIG. 1 is a top plan view of the engine compartment of a motor vehicle with the hood removed to more clearly show the construction of the engine and its induction system and the relationship to the engine compartment.

Referring first in detail to FIG. 1, a motor vehicle powered by an internal combustion engine having an induction system constructed in accordance with an embodiment of the invention is identified generally by the reference numeral 11. Only the forward portion of the vehicle 11 is shown and specifically the engine compartment 12 that is defined by a pair of fender aprons 13 and a front grille opening 14 behind which a cooling radiator 15 is positioned. The hood is removed in FIG. 1 to more clearly show the construction.

An internal combustion engine, constructed in accordance with an embodiment of the invention is identified generally by the reference numeral 16 and, in the illustrated embodiment, comprises a four cylinder in line engine that is positioned transversely across the engine compartment 12. The engine 16 drives the front wheels (not shown) of the vehicle 11 through a suitable transmission and differential mechanism as is well known in this art.

Figure 2:
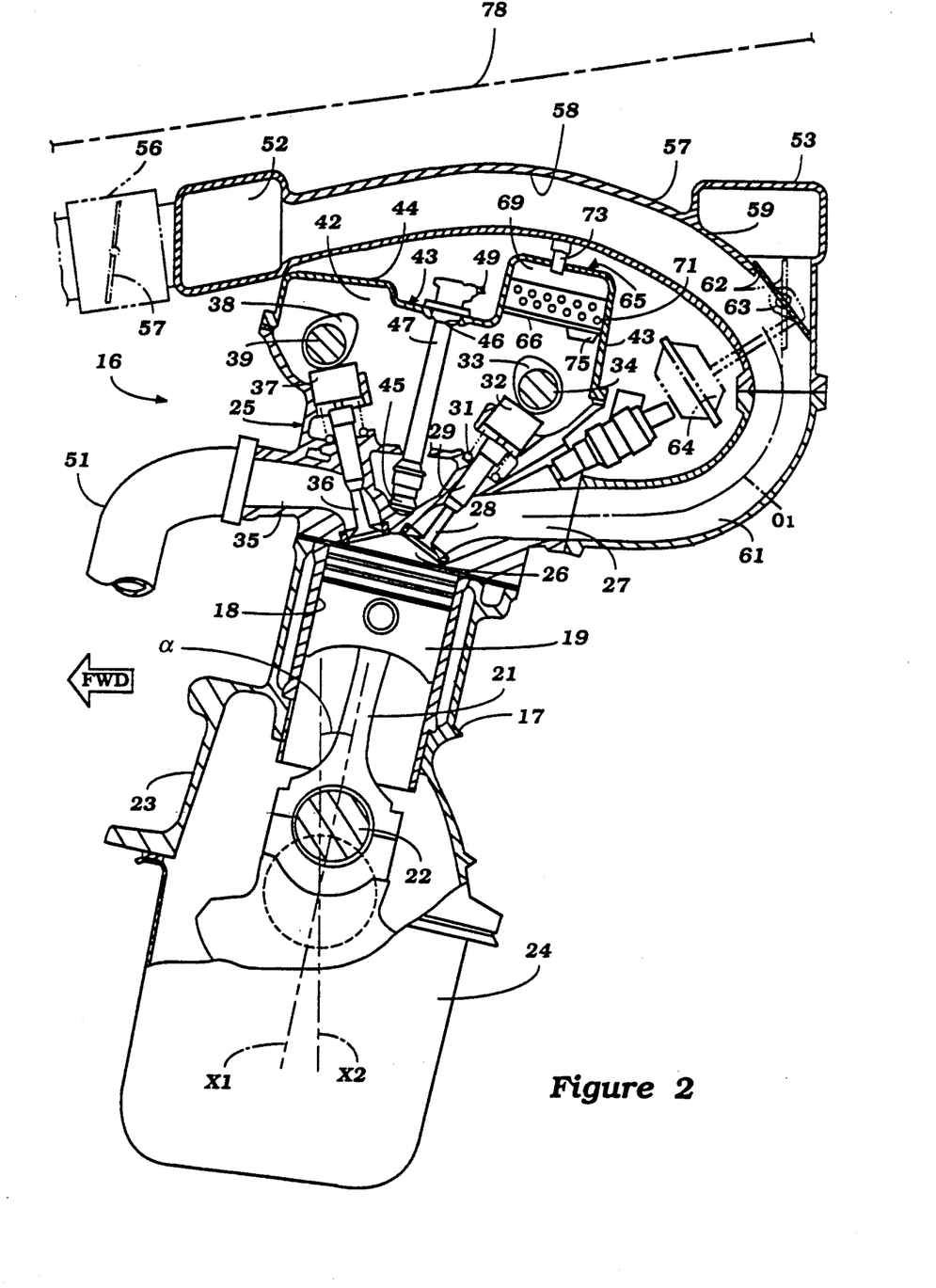
FIG. 2 is an enlarged cross sectional view taken along a plane perpendicular to the plane of FIG. 1 and generally through the cylinder bore axis of one of the cylinders of the engine.
Figure 3:
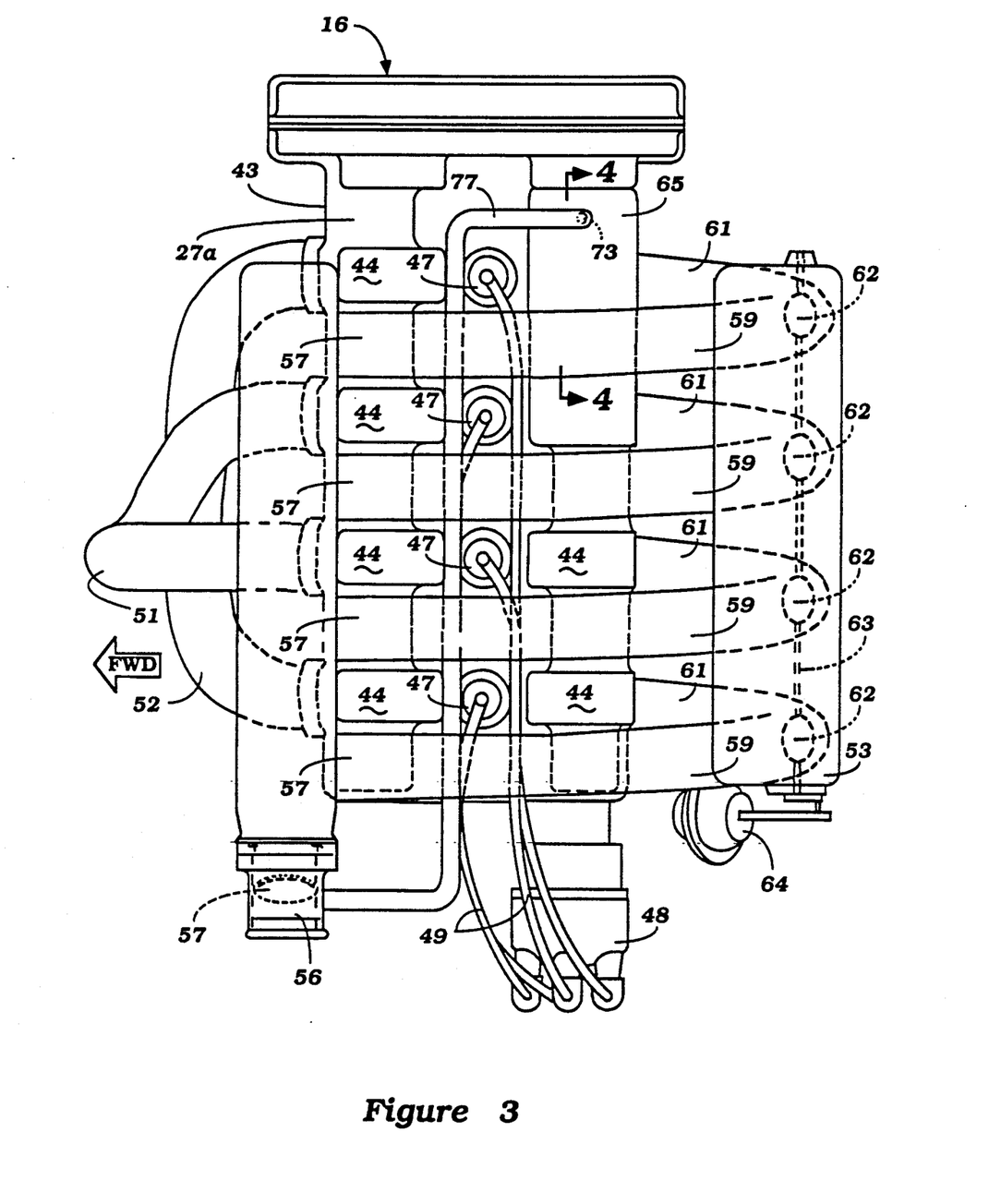
FIG. 3 is a top plan view of the engine on an enlarged scale.

Referring now additionally to FIGS. 2 and 3, the engine 16, as has been previously noted, is of the four cylinder in line type. To this end, a cylinder block 17 is provided with four aligned cylinder bores 18 in which pistons 19 reciprocate. The pistons 19 are connected by means of connecting rods 21 to individual throws of a crankshaft 22 for driving the crankshaft as is well known. The crankshaft 22 is journaled for rotation within a crankcase chamber defined by a skirt 23 of the cylinder block 17 to which a crankcase or oil pan 24 is affixed in a known manner.

A cylinder head assembly 25 is affixed to the cylinder block 17 in a known manner and has individual combustion chamber recesses 26 that cooperate with the cylinder bores 18 and pistons 19 to form the combustion chambers of the engine. A plurality of intake ports 27, in the illustrated embodiment, one for each combustion chamber 26, extend through the rear face of the cylinder head 25 and terminate at the combustion chambers 26. Poppet type intake valves 28 are slidably supported by guides 29 in the cylinder head 25 and are urged toward their closed positions by means of coil compression springs 31. Thimble tappets 32 are slidably supported in the cylinder head assembly 25 and are operated by the lobes 33 of an intake camshaft 34. The camshaft 34 is journaled for rotation in the cylinder head assembly 25 by bearing surfaces of the cylinder head to which bearing caps (not shown) are applied in a well known manner.

Exhaust ports 35 extend through the cylinder head assembly 25 from the combustion chambers 26 to the forward side of the cylinder head assembly 25. As a result, a cross flow cylinder head assembly is provided. Exhaust valves 36 control the opening and closing of the exhaust ports 35 and are urged toward their closed position by coil compression springs. Tappet assemblies 37 are slidably supported in the cylinder head assembly 25 and are operated by the lobes 38 of an exhaust camshaft 39. The exhaust camshaft 39 like the intake camshaft 34 is journaled for rotation relative to the cylinder head by means including bearing caps (not shown).

In the illustrated embodiment, there are provided four valves per cylinder. That is, there are two intake valves 28 for each cylinder and two exhaust valves 36 for each cylinder. However, the intake ports 27 and the exhaust ports 35 are siamese. That is, the intake and exhaust ports 27 and 35 each emanate from a single passageway formed in the respective intake and exhaust side of the cylinder head assembly 25 and then diverge to the individual seats associated with the intake and exhaust valves 28 and 36. Of course, the invention can be utilized in conjunction with engines having different numbers of valves per cylinder.

The valve train as thus far described is contained within a cavity or valve chamber 42 that is formed at the top of the cylinder head assembly 25 and which is closed by a cam cover 43 that is affixed to the cylinder head assembly 25 in a known manner. The cam cover 43 is provided with protrusions 44 adjacent the camshaft bearing caps (except where will be hereinafter noted) which protrusions overlie the camshaft bearing caps so as to provide a clearance area.

Spark plugs 45 are mounted in the cylinder head assembly 25 and are accessible through openings 46 in the cam cover 43. Respective terminals 47 are affixed to the tips of the spark plug and are fired from a distributor 48 (FIGS. 1 and 3) that is located at one end of the engine and which may be driven from the intake camshaft 34 in a suitable manner. Spark leads 49 extend from this distributor 48 to the individual spark plug terminals 47.

An exhaust manifold 51 is affixed to the exhaust or forward side of the cylinder head assembly 25 and conveys the exhaust gases to the atmosphere through an appropriate exhaust system (not shown).

The engine 16 is also supplied with an induction system for delivering a fuel/air charge to the individual intake ports 27 of the cylinder head assembly 25 for delivery to the combustion chambers 26. This induction system includes a first plenum chamber 52 that extends generally along the length of the engine over the exhaust manifold 51 on the exhaust side of the cylinder head assembly 25. There is further provided a second plenum chamber 53 which also extends along the length of the engine 16 but which is positioned on the intake side of the cylinder head assembly 25.

As will be described, the plenum chamber 52 and the runners associated with it are designed so as to primarily improve low and midrange performance. The plenum chamber 53, on the other hand, is designed so as to improve high speed performance.

Air is delivered from the atmosphere to each of the plenum chambers from an air cleaner silencer assembly 54 (FIG. 1) that is positioned in the engine compartment 12 immediately ahead of a battery 60. A short connecting pipe 55 connects the intake device 54 with a throttle body 56 in which a manually operated throttle valve 57 is positioned for controlling the speed of the engine. Air from the plenum chamber 52 is delivered to the plenum chamber 53 through the induction system which will now be described.

A plurality of generally horizontally extending runner pipes 57, one for each cylinder, extend transversely across the cylinder head assembly 25 from the plenum chamber 52 toward the plenum chamber 53. These runners 57 define individual passageways 58 that will supply air from the induction system as thus far described and specifically from the plenum chamber 52 to the individual cylinders of the engine. These runners extend through recesses formed in the cam cover assembly 43 between the protuberances 44 and specifically at locations that are spaced from the spark plugs 45.

As may be best seen in FIG. 2, the runners 57 have a reentrantly curved portion 59 which merges into a manifold section 61 that is attached to the cylinder head and which communicates with its intake ports 27. As a result of this configuration, there is a relatively long intake path provided from the plenum chamber 52 through the runners 57, their portions 59 and the manifold 61 which can be tuned to provide good induction efficiency at low and medium speeds.

The plenum chamber 53 also communicates with the reentrant sections 59 and manifold 61. However, a throttle valve assembly comprised of a plurality of individual throttle valves 62 supported on a throttle valve shaft 63 controls the communication of the plenum chamber 53 with the intake ports 27. A suitable load responsive device such as a vacuum motor 64 (FIGS. 1 and 3) controls the opening and closing of the control valves 62. The operation is such that the valves 62 are maintained in a closed position at low and midrange performance and are opened at high speed. The length of the passages downstream of the valve 62 that communicate the plenum chamber 53 with the combustion chambers 26 is tuned so as to provide good high speed performance. As a result, the described induction system provides good performance under all running conditions and high output can be achieved without sacrificing midrange or low speed performance.

The engine 16 is provided with a crankcase ventilating system that circulates air through the crankcase chamber above the level of oil in the oil pan 24 and also through the cam chamber cavity 42. This circulating air will tend to pick up small particles of lubricant. Unless these are separated, this lubricant will be delivered to the atmosphere. In order to provide such oil separation, a crankcase ventilation oil separator, indicated generally by the reference numeral 65 is provided. The separator 65 is contained within the cam cover 44 over the intake camshaft 34. This results in the formation of a protuberance which, in this embodiment, is at one end of the cam cover 43 and specifically the end adjacent the camshaft drive.

Figure 4:
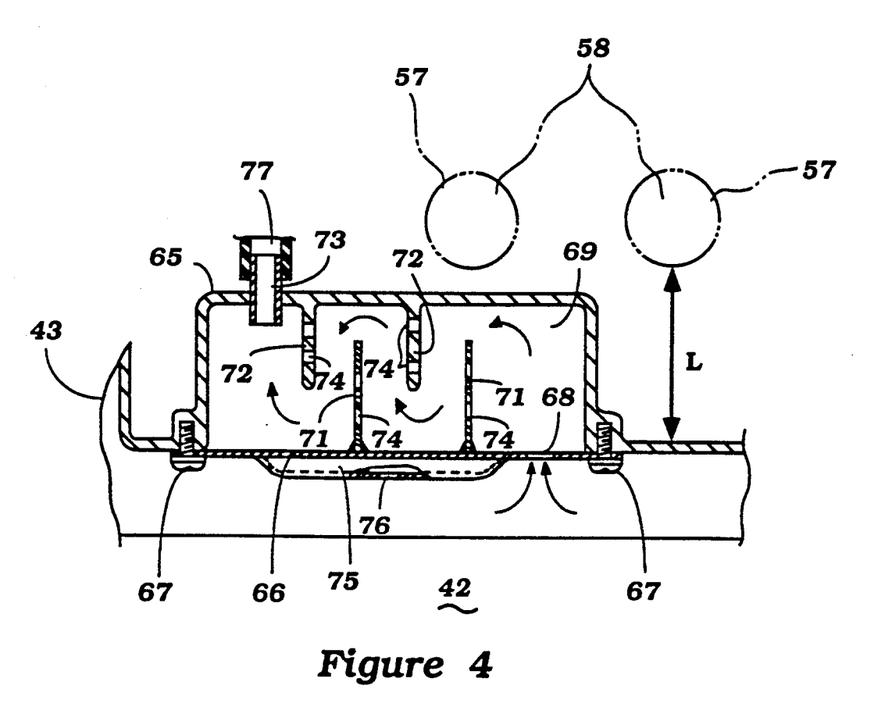
FIG. 4 is an enlarged cross sectional view taken along the line 4—4 of FIG. 3.

As may be best seen in FIGS. 2 and 4 the oil separator 65 is comprised of a lower baffle plate 66 that is held to the underside of the cam cover 43 by means of a plurality of screws 67. An air opening 68 is formed in the baffle plate 66 adjacent one end thereof and permits air to flow into a cavity 69 defined by the baffle plate 66 and the protuberance of the cam cover. A plurality of vertically extending separator baffles 71 extend upwardly from the baffle plate 66 and a plurality of downwardly extending baffles 72 extend from the cam cover 20 so as to provide a labyrinth path from the inlet opening 68 to an outlet nipple 73. Perforations 74 may be formed in the baffle plate 71 and 72 so as to facilitate flow and also to improve the separation characteristics. Oil which has been separated due to the circuitous or labyrinth flow path will accumulate on a depression 75 of the baffle plate 66 and can be returned into the cam cover cavity 42 through a small drain opening 76.

Rather than discharging the crankcase ventilating gases from the separator 65 back to the atmosphere directly, these gases are introduced to the induction system through a flexible conduit 77 that extends from the discharge nipple 73 back to the throttle body 56 upstream from the throttle valve 57 but downstream of the air inlet device 54. As a result, the crankcase gases will be drawn into the combustion chamber and any deleterious products such as any lubricant that may pass by the separator 65 will be burned in the combustion chambers and will not be discharged to the atmosphere.

It should be noted that the fact that the cam cover protuberance which forms the oil separator 65 extends upwardly from the cylinder means that the adjacent portion of the manifold runners 57 must be spaced above it. This can give rise to an unsatisfactory height for the engine compartment and may provide clearance problems with the hood, as shown at 78 in FIG. 2. In order to avoid this, the engine is disposed so that the axis of the cylinder bores 18 (X1) is inclined rearwardly from a vertically extending plane X2 so as to permit a good height L between the manifold runners 57 and the oil separator 65 without increasing the overall vertical height of the engine within the engine compartment. The angle of inclination is indicated at a in FIG. 2.

Figure 5:
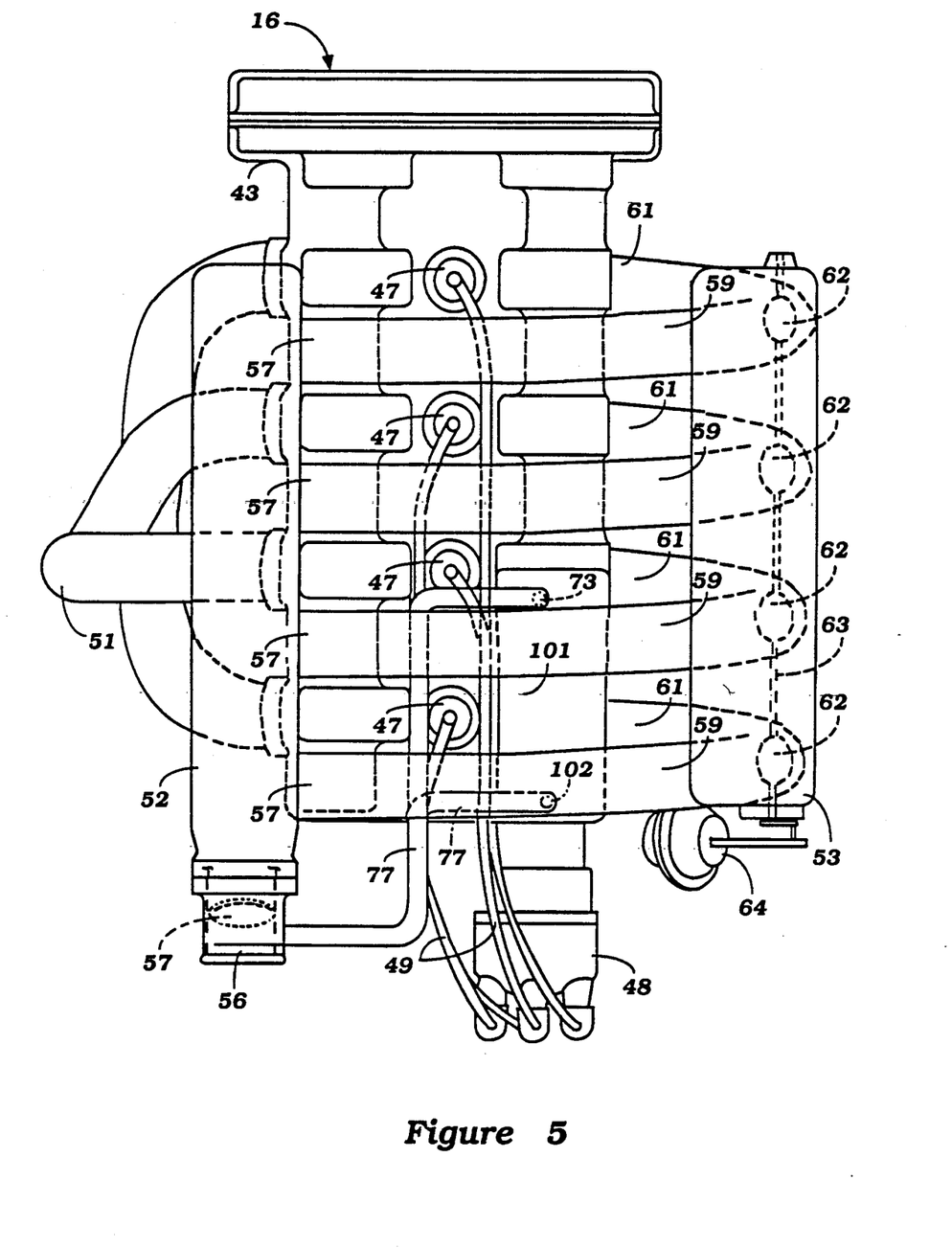
FIG. 5 is a top plan view, in part similar to FIG. 3, showing another embodiment of the invention.

It has been noted that the oil separator 65 is positioned at the end of the engine where the camshafts 34 and 39 are driven. An accessory such as a generator, alternator, air conditioning compressor or power steering pump 78 is also driven at this end of the engine. In some instances, however, it may be desirable to position the oil separator at the other end of the engine. FIG. 5 shows such an embodiment. In this embodiment, the oil separator is indicated generally by the reference numeral 101 and has an internal construction as with the previously described embodiment. Because of this similarity between these embodiments, components which are the same have been identified by the same reference numeral and will not be described again. In fact, the internal construction of the oil separator 101 may be the same as that of the embodiment of FIGS. 1 through 4. For that reason, no cross sectional view is shown. Also, rather than having the nipple 73 located at the end of the oil separator 101 closest to the cam drive, an alternative nipple location is shown at 102 in phantom lines in this figure.

Figure 6:
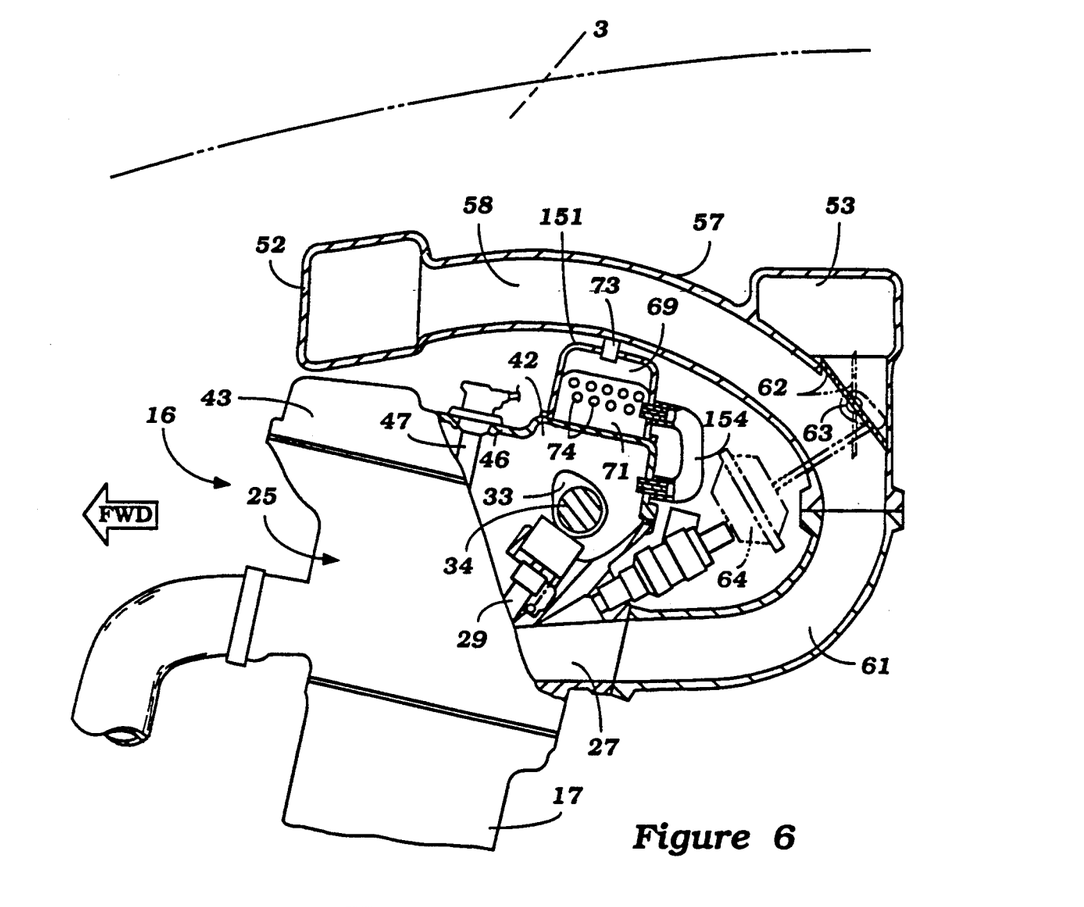
FIG. 6 is a side elevational view, with a portion shown in section, of yet another embodiment of the invention.
Figure 7:
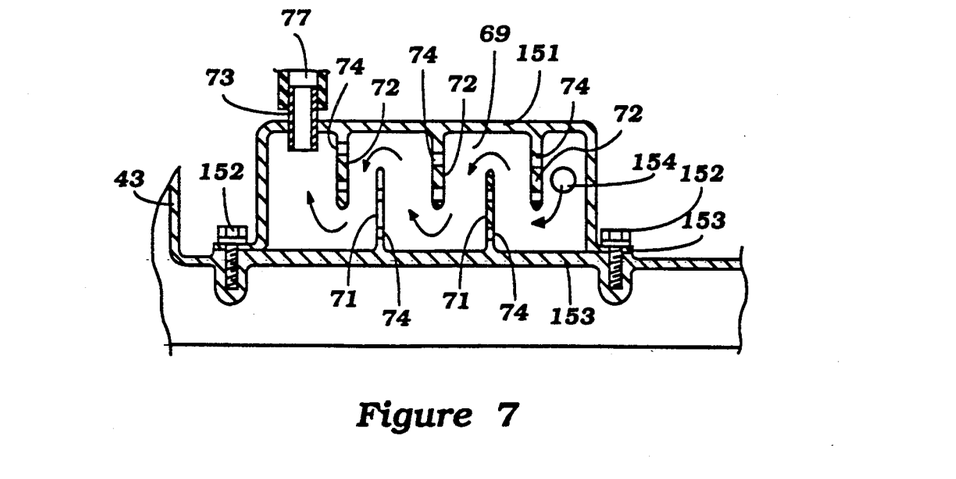
FIG. 7 is a cross sectional view taken through the oil separator of this embodiment.

In the embodiments of the invention as thus far described, the oil separator 65 was formed by a protuberance in the cam cover 43 and a baffle plate 66. FIGS. 6 and 7 show another embodiment of the invention wherein the construction is somewhat reversed. However, the general configuration is the same and, for that reason, components which are substantially the same have been identified by the same reference numerals. It should be noted that an inverted dome shaped plate 151 is affixed to an upper wall of the cam cover 43 by means of threaded fasteners 152 that are tapped into threaded openings in the cam cover and which pass through a peripheral flange 153 of the member 151. In this embodiment, the baffle plates 71 are formed directly in the cam cover and the baffle plates 72 are formed internally in the dome shaped member 151. Perforated openings 74 are formed in both the baffle plates 71 and 72.

An oil drain hole 153 extends directly through the cam cover in the area under the member 151. In this embodiment, the crankcase gases are delivered from the valve chamber 42 to the separator through an external conduit 154 that mates with nipples formed in the cam cover 43 and member 151. In all other regards, this embodiment is the same as those previously described. For that reason, further discussion and description of this embodiment is believed to be unnecessary.

Figure 8:
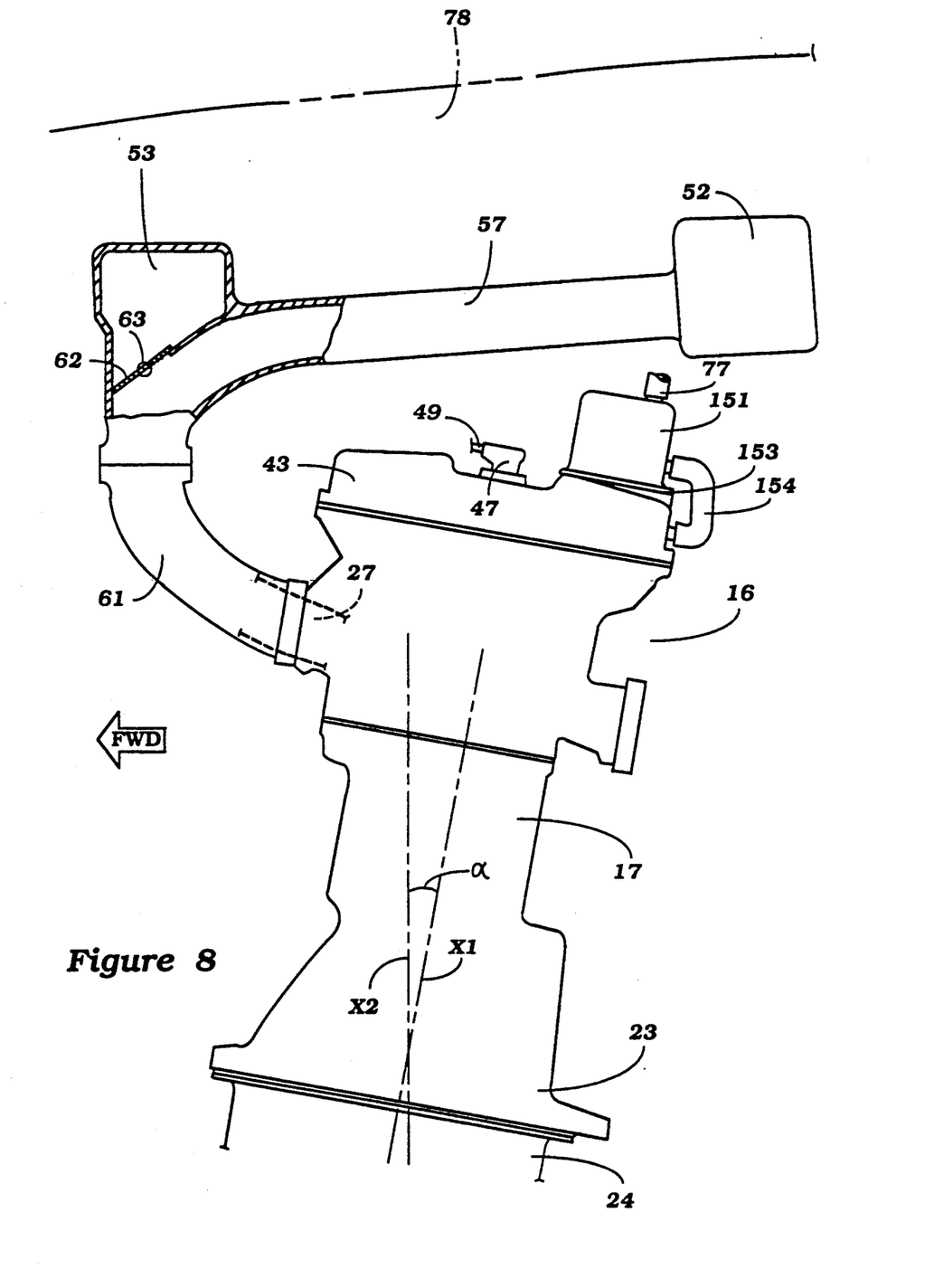
FIG. 8 is a side elevational view, with a portion broken away, of another embodiment of the invention.

In the embodiments of the invention as thus far described, the oil separator 65 has been positioned on the intake side of the engine and this side has been inclined rearwardly from the vertical plane. In some instances, it may be more preferable to reverse the construction so that the oil separator is positioned on the exhaust side of the engine. When this is done, it may be desirable to place the intake side of the engine at the front rather than the rear. FIG. 8 shows such an embodiment and since the construction of this embodiment is otherwise the same as the previously described embodiments, components which are the same or substantially the same have been identified by the same reference numerals. Also, the actual construction of the oil separator in this embodiment may be of any of the previously described types. The type of construction shown in FIGS. 6 and 7 has been illustrated by way of example. In all other regards, this embodiment is the same as those which have already been described. Because of this construction, it is not necessary to employ any curvature in the runners 57.

It should be readily apparent from the foregoing descriptions that a number of embodiments of the invention have been illustrated and described, each of which permits the use of an oil separator in the cylinder head assembly with an induction system that passes over the cylinder head assembly and over the oil separator without significantly increasing the height of the engine due to the slanted configuration of the cylinder block. Although a number of embodiments have been illustrated and described, various changes and modifications may be made without departing from the spirit and scope of the invention, as defined by the appended claims.

We claim:

1. An internal combustion engine having a cylinder block with at least one cylinder bore formed therein, a cylinder head assembly affixed to said cylinder block and closing said cylinder bore, a crankcase ventilation oil separator affixed to said cylinder head assembly and protruding at least in part upwardly therefrom, an intake port formed in one side of said cylinder head assembly for supplying a charge to said cylinder bore, and an intake manifold extending from said intake port and across said cylinder head assembly toward the other side thereof and above said crankcase ventilation oil separator, said cylinder block being disposed with its axis inclined to the vertical for increasing the distance between said crankcase ventilation oil separator and said intake manifold without increasing the height of the engine.

2. An internal combustion engine as set forth in claim 1 wherein the crankcase ventilation oil separator lies on the same side of the cylinder head assembly as the intake port.

3. An internal combustion engine as set forth in claim 2 wherein the engine is inclined from the vertical toward the one side of the engine.

4. An internal combustion engine as set forth in claim 1 wherein the crankcase ventilation oil separator is positioned on the other side of the cylinder head from the intake side.

5. An internal combustion engine as set forth in claim 4 wherein the engine is inclined from the vertical toward the crankcase ventilation oil separator side of the cylinder head.

6. An internal combustion engine as set forth in claim 1 wherein the cylinder head assembly includes a pair of camshafts covered by a cam cover and wherein the oil separator is affixed to the cam cover over one of the camshafts.

7. An internal combustion engine as set forth in claim 6 wherein the crankcase ventilation oil separator lies on the same side of the cylinder head assembly as the intake port.

8. An internal combustion engine as set forth in claim 7 wherein the engine is inclined from the vertical toward the one side of the engine.

9. An internal combustion engine as set forth in claim 6 wherein the crankcase ventilation oil separator is positioned on the other side of the cylinder head from the intake side.

10. An internal combustion engine as set forth in claim 9 wherein the engine is inclined from the vertical toward the crankcase ventilation oil separator side of the cylinder head.

* * * * *